United States Patent [19]

Boon et al.

[11] 4,356,219

[45] Oct. 26, 1982

[54] TREATED YARN, METHOD OF PREPARATION AND RUBBER/CORD COMPOSITE

[75] Inventors: Wyndham H. Boon, North Canton, Ohio; Abdel-Hadi Sid-Ahmed, Alpharetta, Ga.

[73] Assignee: The Goodyear Tire & Rubber Company, Akron, Ohio

[21] Appl. No.: 212,302

[22] Filed: Dec. 3, 1980

[51] Int. Cl.$^3$ .................. B05D 3/02; D02G 3/02; D02G 3/36

[52] U.S. Cl. .................. 427/386; 57/237; 57/238; 57/241; 57/242; 156/110 A; 427/389.9; 427/412.5; 427/430.1; 428/361; 428/395; 252/8.9

[58] Field of Search .................. 156/110 A, 110 MD; 427/386, 389.9, 412.5, 430.1; 428/265, 288, 290, 395, 361; 57/237, 238, 241, 242; 252/8.9

[56] References Cited

U.S. PATENT DOCUMENTS 4,115,621 9/1978 Hawkins .................. 428/395
4,179,543 12/1979 Hawkins .................. 428/395 X Primary Examiner—Michael R. Lusignan
Attorney, Agent, or Firm—H. C. Young, Jr.

[57] ABSTRACT

A method is provided which comprises preparing a drawn, coated polyester yarn by applying an aqueous emulsion of an epoxy resin and spin finish fiber treatment oil to spun or drawn yarn, said oil is comprised of a mixture of pentaerythritol tetraester ($C_{12}$-$C_{14}$) fatty acid, polyoxy ethylene nonyl phenol and oleyl diethyl imidazoleimium sulfate.

7 Claims, No Drawings

TREATED YARN, METHOD OF PREPARATION AND RUBBER/CORD COMPOSITE

FIELD OF INVENTION

This invention relates to adhering polyester yarn and/or cord of multiple yarns thereof to rubber. The invention further relates to a composite of rubber and a polyester cord reinforcement therefor.

BACKGROUND OF THE INVENTION

Composites of fiber-reinforced rubber are useful for many purposes including pneumatic tires and industrial belts. Typically, such reinforcing fibers are in the form of a cord comprised of cabled and twisted yarn. Such fibers can be of various materials including nylon, polyester, wire, rayon, cotton and glass.

An important requirement of such reinforced rubber composite is the adhesion of the reinforcing fiber or cord to the rubber itself. Such adhesion is of particular importance where the resulting composite is subjected to considerable flexing and distortion, such as contortions encountered in the typical operation and use of pneumatic tires and industrial belts.

Various methods have been proposed and used to obtain adhesion of fiber or cord to rubber. For example, the cord has been pre-treated prior to adhering to rubber by dipping, followed by drying, in an aqueous emulsion comprised of a resorcinol/formaldehyde latex (RFL), a latex treatment well-known to those having skill in the art, in which the resorcinol/formaldehyde resin is a part of an aqueous latex, usually a butadiene/styrene/vinylpyridine terpolymer. The resorcinol/formaldehyde resin is understood to be a primary element of the adhesive between the cord and the rubber with the latex being an important factor in somewhat reducing the modulus of the resin. Other advantages and features of the RFL for adhering cord to rubber are generally well-known to those having skill in the art.

However, it is still desired to provide advantageous methods of bonding polyester yarn and/or cords thereof to rubber compounds and to provide the resulting composite.

DISCLOSURE AND PRACTICE OF THE INVENTION

It has been discovered that adhesion between a polyester yarn or cord thereof to rubber can be enhanced by application of a composition to the yarn or cord prior to adhering to the rubber. The composition can be applied to spun yarn before or to drawn yarn after drawing of the yarn or after twisting and cabling of the drawn yarn to form the cord.

In accordance with this invention a drawn yarn composite comprises a polyester yarn, optionally in the form of a multiple of twisted or cabled drawn yarns to form a cord thereof, and a coating thereon, comprised of, based on the yarn, (A) about 0.5 to about 1.5 weight percent of a spin-finish fiber treatment oil comprised of a mixture of (1) pentaerythritol tetraester ($C_{12}$-$C_{14}$) fatty acid, (2) polyoxy ethylene nonyl phenol and (3) oleyl diethyl imidazoleimium sulfate and (B) about 0.4 to about 1.5 weight percent epoxy resin having a melting point below about 75° C. and, correspondingly, about 9 to about 3, preferably about 8 to about 4 weight percent 2-($\beta$-dimethylamino ethoxy)-4-methyl-1,3,2-dioxaborinane.

The polyester yarn composite is prepared by application of coating to spun or drawn polyester yarn, preferably to spun yarn prior to drawing, followed by drawing the yarn with an aqueous emulsion of an epoxy resin and spin finish fiber treatment oil. The epoxy resin can be applied simultaneously with, before or after the treatment oil. The adhesive system requires the presence of the spin-finish oil for effective rubber to polyester fiber adhesion.

Thus, the invention is directed to (A) the yarn composite, (B) twisted and cabled yarn composites in the form of a cord and (C) a rubber composite comprised of rubber reinforced with the cord (B).

Spun yarn prior to drawing is preferably coated as a single strand on a continuous basis, with the aqueous emulsion(s) of the epoxy and spin-finish oil. For example, the epoxy and spin-finish oil can be applied to the yarn as a single emulsion. Alternately, sequential applications of the epoxy emulsion and spin-finish emulsion can be applied to the yarn in either order but close enough together to be essentially or practically a simultaneous application. The emulsions at least partially intermix and preferably not become separate layers on the yarn. The treated spun yarn is dried by heat generated in the subsequent drawing step.

Optionally, drawn yarn (spun yarn after being drawn) can be similarly treated. The treated drawn yarn is then dried.

Application of the emulsion can be done by conventional methods such as kiss roll application where the yarn is passed over and in contact with a rotating drum which has its lower portion immersed in the aqueous emulsion dip. The yarn is coated by the aqueous emulsion which is carried on the surface of the rotating drum. The drum itself is rotating in the same direction as the yarn but at a somewhat slower speed.

Alternately, the emulsion can be metered directly onto the yarn or cord.

In the drawing step, spun yarn is fed around (with several wraps) a top, heated rotating roll, down past a heated platen and around (with several wraps) a bottom roll, which can optionally be heated, which is rotating faster than the top roll.

If the yarn has been treated by the method of this invention as a spun yarn, then, because of somewhat increased frictional resistance or drag presented by the coating thereon, the drawing step conditions may have to be modified from conventional drawing conditions. For example, it may be desired to reduce the temperature and rate, or speed of drawing. Indeed, it has been observed that the temperature of the top roll should be operated at about 95° C. to about 115° C., the platen at about 200° C. to about 220° C. and the bottom roll at about 90° C. to about 175° C. while the speed is adjusted to about 155 to about 315 meters/min. Emulsions can be applied as a single emulsion or as two individual emulsions as previously described. The yarn or cord can then be passed through an oven to dry it by removing the moisture. It is recognized that the drying treatment may cause some low level of epoxy reaction.

After drawn yarn has been thusly treated, it is subsequently twisted and cabled to produce a cord.

The cords prepared from such emulsion-coated yarns are then dipped, preferably on a continuous basis, in a single resorcinol-formaldehyde resin/latex-type (RFL) dip. The cord, after dipping, is dried by passing through an oven at about 230°-270° F. to reduce the water content of the coating and then heated under tension in an oven at about 420°-500° F. for about 60-180 seconds for further drying. Typically, the pre-drying, or first drying, temperature is about 250° F. and the second oven temperature is about 460° F. with an overall drying residence time of the cord being about 70 seconds.

The ratio of spin-finish oil to epoxy is important and a weight ratio thereof is desired to be in the range of about 1/15 to about 5/1 in order to obtain adequate to be in the range of about 1/15 to about 5/1 in order to obtain adequate adhesion and to obtain effective dynamic properties of the cord as a rubber reinforcement member. The total amount of the spin-finish oil and the epoxy together ranges from about 0.9 to about 2.0 weight percent based upon the yarn or cord itself. It is important to appreciate that both the total amount of finish and the weight ratio of the spin-finish oil to epoxy is critical for both adhesion and processability of the yarn.

Various aqueous emulsions of epoxy can be used, representative of which are glycidyl ethers of phenol novalacs and glycidyl ethers of bisphenol-A, as well as other epoxys such as glycidyl ethers based on oligomers from bisphenol-A and epichlorohydrin, diglycidyl ethers of catechol resorcinol, and hydroquinone and triglycidyl ethers of trimellitic and trimisic acid. An example of a commercial epoxy which can be used in this invention is a glycidyl ether of a phenol novalac, which can reportedly be obtained as Ciba Geigy EPN-1138.

Such an emulsion could be prepared by heating the epoxy to a temperature in the range of about 85° C. to about 95° C., then adding a small amount of 2-($\beta$-dimethylamino ethoxy)-4-methyl-1,3,2-dioxaborinane, (reportedably obtainable from U.S. Borox as USB-110) in the amount of about 3 to about 9, preferably about 4 to about 8 weight percent based on the weight of epoxy, followed by vigorous stirring for a few minutes. Then water is generally added rapidly to bring the aqueous emulsion to a solids content of about 10 to about 50 weight percent.

The spin-finish oil can be of various types, representative of which is a composite comprised of (a) pentaerythritol tetraester ($C_{12}$-$C_{14}$) fatty acid, (b) polyoxyethylene nonyl phenol and (c) oleyl diethyl imidazoleimium sulfate.

This aqueous emulsion adhesive system has a particular advantage of being directly applied to spun yarn and which acquires only a single application of a later RFL dip to the cord, although a double dip can be used if desired.

Although the mechanism is not completely understood, apparently the application of the aqueous emulsion system as a treatment to the spun yarn in some manner allows an interaction of the epoxy with the amorphous polyethylene terephthalate yarn which, in turn, provides an enhanced adhesion at a later time with the RFL adhesive application. The RFL adhesive is important for the ultimate, or eventual, rubber to cord adhesion.

The emulsion system, in addition, has an advantage of providing a relatively low volatility and low toxicity treatment which makes the use of such a system more convenient since its handling requirements are significantly reduced as compared to other conventional coating systems.

The practice of this invention is further illustrated by reference to the following examples which are intended to be representative rather than restrictive of the scope of the invention. Unless otherwise indicated, all parts and percentages are by weight.

EXAMPLE I (Preparation of Epoxy Emulsion)

An aqueous emulsion of an epoxy resin was prepared according to the recipe of Table 1:

TABLE 1

| Material | Parts |
| --- | --- |
| Glycidyl ether of Bisphenol-A[1] | 400 |
| Catalyst | 24 |
| De-Ionized Water | 600 |

[1]Obtained as Ciba-Beigy EPN-1138.

The epoxy was heated to about 90° C. by the method of heating it with stirring, to about 95° C. and then allowing it to cool to the required 90°±1° C. To the heated epoxy was added the catalyst, rapidly, while still stirring. The mixture was vigorously stirred for another three and one-half minutes and then the water was rapidly added. The resulting emulsion (40 percent solids) was stirred until the temperature dropped below 40° C. Then the stirring was discontinued and a relatively stable emulsion was observed.

EXAMPLE II (Preparation of Single Component Emulsion)

A single component emulsion was prepared according to the following Table 2;

TABLE 2

| Material | Parts |
| --- | --- |
| Finish Oil[1] | 125 |
| Aqueous Emulsion of Epoxy[2] | 312 |
| De-Ionized Water | 300 |

[1]A fiber treatment oil comprised of a mixture of
(1) pentaerythritol tetraester ($C_{12}$-$C_{14}$) fatty acid,
(2) polyoxy ethylene nonyl phenol and
(3) oleyl diethyl imidazoleimium sulfate.
[2]The aqueous emulsion from Example I.

The spin-finish oil and water were mixed at about room temperature (about 25° C.) and stirred vigorously for about five minutes. To the mixture was then added the aqueous epoxy emulsion with high shear agitation (using an Ebenbach mixer or Osterizer) for about five minutes.

EXAMPLE III (Yarn and Cord Preparation)

A polyester (polyethyl terephthalate) of 1.04 Intrisic Viscosity (IV) was extruded on a 2 inch Sterling extruder at a rate of 60 lbs. per hour and were quenched to produce a spun yarn of 192 filaments. A 25 percent emulsion of finish oil described in Example II (obtained lurol pump and a metering head so that 0.8 weight percent of the epoxy is added to the spunyarn. Subsequently and sequentially, the epoxy emulsion prepared according to Example I and dilluted somewhat with water to form a 25 percent solids emulsion was applied to the yarn. The aqueous emulsion-treated yarn was then taken up, or wound, on a bobbin. The yarn was subsequently unwound from the bobbin and drawn by stretching through or on a drawtwister resin at 5.84/1 draw ratio. Thus, the yarn is stretched almost six times its original length. The top roll of the drawtwister was heated to 110° C. and wound with 5 wraps of yarn. The platen or hot plate, in the drawtwister was heated to 215° C. and the bottom roll heated to 165° C. and water with five wraps of yarn. The delivery speed of the yarn was 315 m/min.

The drawn yarn was then twisted, and then cabled, to produce a cord of 1500/3, 7.0/7.0 construction.

The 1500 resins to the denier shear fiber, the 3 represents the number of fibers shear cord and the 7.0/7.0 represents the residual twist.

The yarn and cord properties are listed in Table 3.

TABLE 3

| Yarn Properties | |
|---|---|
| Physical | |
| Denier, g/9000m | 1508 |
| Tensile, lb. | 27.3 |
| Tenacity, g/denier | 8.2 |
| Elongation at break, % | 14.1 |
| Modulus, g/denier | 109 |
| Chemical | |
| IV | 0.88 |
| COOH, eq/10$^6$gPET[1] | 20.5 |
| % FOY (drawn Yarn)[2] | 1.2 |
| Cord Physicals | |
| Denier, g/9000m | 4908 |
| Tensile, lb | 71.3 |
| Tenacity, g/denier | 6.5 |
| Elongation at break, % | 18.9 |
| Twist | 7.1/7.1 |

[1]PET means polyethylene terephthalate yarn.
[2]FOY means finish on yarn.

The cord was then tested for rubber adhesion and compared to cord produced similarly but without the epoxy finish application. The results are shown in Table 4.

TABLE 4

| Cord | 250° F. Peek Adhesion lbs/in. | RT Peel Adhesion lbs/in |
|---|---|---|
| Control | 10 | 54 |
| Experimental | 72 | 104 |

EXAMPLE IV

Dual Kiss Roll Application

Polyethylene terephthalate of 1.06 I.V. and 9.8 COOH eq/10$^6$b PET was extruded from a 2 inch Sterling Extruder at 41 lbs./hr. as a 192 filament yarn. The yarn was passed over to kiss rolls after quenching. The first kiss roll applied a 25 percent solid finish oil (Lurol XP-346) such that 0.9 weight percent was on the yarn. The second kiss roll then applied the epoxy emulsion described in Example I diluted to 12.5 weight percent. This was applied such that 0.9 weight percent is added to the yarn. The yarn was then taken up on a bobbin. The yarn was then drawn on a drawtwister using the following conditions shown in Table 5.

TABLE 5

| Temperature | Conditions |
|---|---|
| Top Roll, °C./wraps | 180°/4 |
| Plate °C. | 210° |
| Bottom Roll, °C./wraps | AMB$^a$/5 |
| Delivery speed, m/min | 155 |
| Total Draw | 6.199 |

$^a$roll equilibrates to approximately 100°C.

The drawn yarn was then twisted and cabled to produce a cord of 1500/2, 9.0/9.0 construction.

The yarn and cord properties are given in Table 6.

TABLE 6

| Yarn Physical Properties | |
|---|---|
| Denier, g/9000m | 1560 |
| Tensile, lbs | 29.9 |
| Tenacity, g/denier | 8.7 |
| Elongation at break, % | 9.2 |
| Yarn Chemical Properties | |
| IV | 0.89 |
| COOH, eq/10$^6$g PET | 13.8 |
| FOY, wt % | 1.8 |
| Cord Physical Properties | |
| Denier, g/9000m | 3410 |
| Tensile, lbs. | 52.5 |
| Tenacity, g/denier | 6.98 |
| Elongation at break, % | 12.6 |
| Twist | 9.1/8.7 |

These cords were then subjected to the Peel Adhesion tests and compared to cords made similarly except without the addition of the epoxy finish shown in Table 7.

TABLE 7

| | Peel Adhesion, Lbs/In | |
|---|---|---|
| Sample | 250° F. | RT |
| Control | 12 | 70 |
| Example IV | 83 | 117 |

EXAMPLE V

Polyethylene terephthalate was extruded as a 192 filament yarn from a 2-inch Sterling Extruder at 60 lbs./hr. The resin used has an I.V. of 0.95 and 6 COOH eq/10$^6$ ET. To the spun yarn after quenching was added the epoxy finish and the finish oil as one emulsion as described in Example II. The emulsion was applied to the yarn by means of a metering system comprised of gear pump attached to a ceramic jet. The emulsion was added such that 1.3 weight percent of solids was on the yarn. The spun yarn was then taken up on a bobbin. The yarn was then drawn on a drawtwister using the following conditions shown in Table 8.

TABLE 8

| Delivery Speed | 315m/min |
|---|---|
| Temperatures | |
| Top Roll, °C./wraps | 110/4 |
| Platen, °C. | 215 |
| Bottom Roll, °C./wraps | 165/5 |
| No Draw Pin | |
| Total Draw Ratio | 5.84:1 |

The resulting yarn was then twisted and cabled to produce a cord of 1500/2 9/9 construction. The yarn and cord properties are given in Table 9.

TABLE 9

| Yarn Properties | |
|---|---|

TABLE 9-continued

| Physical | |
|---|---|
| Denier, g/9000m | 1520 |
| Tensile, lb. | 27.1 |
| Tenacity, g/denier | 8.1 |
| Elongation at break, % | 13.7 |
| Modulus | 108 |
| Chemical | |
| I.V. | .85 |
| COOH, eq/$10^6$gPET | 12 |
| FOY, weight percent | 1.3 |
| Cord Physical Properties | |
| Denier, g/9000m | 3400 |
| Tensile, lb. | 45.8 |
| Tenacity, g/denier | 6.12 |
| Elongation at break, % | 16.4 |
| Twist | 9/9 |

The cords were then subjected to the rubber adhesion Peel Test with the following results and compared to a cord prepared similarly but without the epoxy shown in Table 10.

TABLE 10

| | Peel Strength, lbs/in | |
|---|---|---|
| Sample | 250° F. | RT |
| Control | 9 | 30 |
| Example V | 76 | 116 |

EXAMPLE VI (Single Metering Head Application)

The yarn and cord was prepared as in Example V except that a series of emulsion were used and at different application rates a shown in Table 11.

TABLE 11

| Sample | Epoxy/Finish Oil Ratio | Application Rate, wt % |
|---|---|---|
| 1 | 0/100 | 1.0 |
| 2 | 50/50 | 1.0 |
| 3 | 50/50 | 1.6 |
| 4 | 40/60 | 1.3 |
| 5 | 40/60 | 0.7 |
| 6 | 40/60 | 1.9 |
| 7 | 40/60 | 1.3 |
| 8 | 30/70 | 1.0 |
| 9 | 30/70 | 1.6 |
| 10 | 30/70 | 0.7 |

The yarn cord properties for these samples are given in Table 12.

TABLE 12

Yarn Properties

| Sample | Denier g/9000m | Tensile lb | Tenacity g/denier | Elongation at break, % |
|---|---|---|---|---|
| 1 | 1546 | 27.3 | 8.01 | 12.4 |
| 2 | 1548 | 27.6 | 8.10 | 14.5 |
| 3 | 1588 | 26.9 | 7.68 | 13.2 |
| 4 | 1554 | 27.7 | 8.08 | 14.4 |
| 5 | 1536 | 28.2 | 8.32 | 14.2 |
| 6 | 1590 | 26.2 | 7.48 | 13.5 |
| 7 | 1592 | 27.9 | 7.96 | 15.4 |
| 8 | 1593 | 27.8 | 7.93 | 16.3 |
| 9 | 15.73 | 27.8 | 8.03 | 14.3 |
| 10 | 1566 | 28.5 | 8.25 | 14.7 |

Cord Properties[a]

| Sample | Denier g/9000m | Tensile | Tenacity | Elongation at break, % | Twist |
|---|---|---|---|---|---|
| 1 | 5051 | 75.8 | 6.60 | 18.4 | 7.0/7.3 |
| 2 | 5205 | 71.8 | 6.07 | 20.8 | 7.2/7.3 |
| 3 | 5218 | 70.7 | 6.15 | 19.5 | 7.1/7.3 |
| 4 | 5110 | 73.4 | 6.52 | 20.2 | 7.0/7.3 |
| 5 | 5131 | 70.4 | 6.23 | 17.8 | 6.8/7.2 |
| 6 | 5323 | 72.5 | 6.18 | 19.0 | 7.1/7.2 |
| 7 | 5127 | 70.8 | 6.27 | 19.1 | 7.0/7.3 |
| 8 | 5158 | 71.4 | 6.28 | 20.7 | 6.9/7.3 |
| 9 | 5442 | 74.1 | 6.18 | 18.5 | 7.9/7.1 |
| 10 | 5333 | 73.8 | 6.28 | 20.3 | 7.0/7.3 |

[a]cord construction 1500/3, 7/7

These cords were then subjected to the rubber adhesion Peel Test and the results are shown in Table 13.

TABLE 13

| Rubber Adhesion Peel Strength, lb/in | |
|---|---|
| Sample | 250° F. |
| 1 | 12 |
| 2 | 68 |
| 3 | 68 |
| 4 | 74 |
| 5 | 60 |
| 6 | 70 |
| 7 | 72 |
| 8 | 61 |
| 9 | 71 |
| 10 | 59 |

In these examples a polymeric polyester yarn or polyethylene terephthalate is used which is the preferred yarn.

Further, in Example III, IV, V and VI, treated and untreated (with the epoxy finish application) yarns, which were subsequently drawn and cabled to form a cord, were submitted to adhesion tests (to rubber). In these several examples, the treated yarns in the form of cords were first treated with an RFL aqueous dip, dried, adhered to vulcanized rubber and then adhesion-tested.

In these Examples, an RFL dip composed of approximately 25 weight percent RF (resorcinol-formaldehyde) resin and 75 weight percent styrene/butadiene/-vinyl pyridine terpolymer was prepared as a 20 percent solids aqueous dispertion and referred to as an emulsion. The RFL was applied to the cord of cabled yarns by dipping the cord into or through it on a continuous basis. The cord was then passed through a first oven at about 250° F. and then through a second oven at about 460° F. on a continuous basis after the dipping. The cord was then ready for adhesion testing.

The adhesion tests were conducted on samples prepared and tested by ASTM Method D2630-71 except that the sample preparation was somewhat modified in that samples were prepared by wrapping cord around a fabric building drum and forming a five layer sandwich construction of, in sequence, layer-by-layer, tape, cord, rubber, cord and tape laminae. The samples were built so that the cords were contiguous or in just a position next to and touching each other.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a drawn, coated polyester yarn which comprises (A) applying aqueous emulsion(s) of epoxy resin and spin finish fiber treatment oil to spun or drawn yarn as (i) the same emulsion or (ii) separate emulsions in either order or simultaneously so that the emulsions are at least partially intermixed on the surface of the yarn and either (B-1) drying the yarn if it has been previously drawn or (B-2) drawing the yarn if the emulsion(s) were applied to a spun (or undrawn) yarn, where said yarn is optionally in the form of a multiple of twisted or cabled drawn yarns to form a cord thereof, and where said applied and dried coating thereon is comprised of, based on the yarn, the product of the mixture of (A) about 0.5 to about 1.5 weight percent of said spin-finish fiber treatment oil comprised of a mixture of (1) pentaerythritol tetraester ($C_{12}$–$C_{14}$) fatty acid, (2) polyoxy ethylene nonyl phenol and (3) oleyl diethyl imidazoleimium sulfate and (B) about 0.4 to about 1.5 weight percent of said epoxy resin having a melting point below about 75° C. and containing about 3 to about 9 weight percent 2-($\beta$-dimethylamino ethoxy)-4-methyl-1,3,2-dioxaborinane based on said epoxy resin.

2. The method of claim 1 where said polyester yarn is polyethylene terephthalate and the weight ratio of spin finish oil to epoxy is in the range of about 1/15 to about 5/1.

3. The method of claim 2 where said epoxy is a glycidyl ether of a phenol novalac.

4. The method of claim 2 where said epoxy is a glycidyl ether of bisphenol-A.

5. The method of claim 2 where said drawn yarn is twisted and cabled to form a cord and further treated by an aqueous RFL dip.

6. The method of claim 5 where said RFL is a resorcinol/formaldehyde resin and butadiene/styrene/vinylpyridine terpolymer latex.

7. The method of claim 3, 4 or 6 where said aqueous emulsions of epoxy and oil are applied to spun yarn as the same emulsion or simultaneously.

* * * * *